United States Patent

[11] 3,624,098

[72] Inventors: Melvin Harris Rosen, Madison; Herbert Morton Blatter, Summit, both of N.J.
[21] Appl. No.: 834,893
[22] Filed: June 19, 1969
[45] Patented: Nov. 30, 1971
[73] Assignee: CIBA Corporation, Summit, N.J.

[54] 1,3,4-THIADIAZOLES
3 Claims, No Drawings
[52] U.S. Cl. .................................... 260/302 SD, 424/270
[51] Int. Cl. .................................... C07d 91/62
[50] Field of Search .......................... 260/302 SD

[56] References Cited
UNITED STATES PATENTS
2,744,908   5/1956   Young .................... 260/302 SD Primary Examiner—Alex Mazel
Assistant Examiner—R. J. Gallagher
Attorneys—Harry Goldsmith, Joseph G. Kolodny and Mario A. Monaco ABSTRACT: New 2-sulfinyl- or sulfonyl-1,3,4-thiadiazoles, e.g. those of the formula

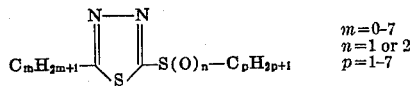

$m=0-7$
$n=1$ or $2$
$p=1-7$ and salts thereof are antibacterial agents.

1,3,4-THIADIAZOLES

SUMMARY OF THE INVENTION

The present invention concerns and has for its object the provision of new aliphatically substituted 2-sulfinyl- or sulfonyl-1,3,4-thiadiazoles, particularly of those having formula I

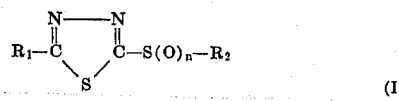

in which $R_1$ is hydrogen or each of $R_1$ and $R_2$ are an aliphatic radical and $n$ is the integer 1 or 2, or salts thereof, as well as of corresponding pharmaceutical compositions and of methods for the preparation and application of these products. Said compositions are useful antibacterial agents.

DESCRIPTION OF THE PREFERRED EMBODIMENTS

An aliphatic radical $R_1$ and $R_2$ is, for example, lower alkyl, e.g. methyl, ethyl, n- or i-propyl, -butyl, -pentyl, -hexyl or -heptyl.

The term "lower", referred to above and hereinafter in connection with organic radicals or compounds respectively, defines such with up to seven, preferably up to four, carbon atoms.

The compounds of the invention exhibit valuable pharmacological properties. For example, they show antibacterial activity, primarily against gram-negative bacteria, such as enterobacteria, e.g. *E. coli*, as can be demonstrated in in vivo tests using, for example, mammals e.g. mice, as test objects. At oral doses between about 10 and 150 mg./kg./day, preferably between about 50 and 100 mg./kg./day, they prolong the life-span of mice, infected with a sufficient amount of *E. coli*, which will kill all untreated animals within 16–24 hours. Accordingly, the compounds of the invention are useful as orally applicable antibacterial agents, but also useful intermediates in the preparation of other valuable products, preferably of pharmacologically active compounds.

Particularly useful are compounds of the formula I in which each of $R_1$ and $R_2$ is lower alkyl, especially methyl, ethyl, n- or i-propyl or -butyl, which show outstanding in vivo activity in mice against *E. coli*, at an oral dose between about 50 and 100 mg./kg./day.

The compounds of the invention are prepared according to methods in themselves known. For example, the process for their preparation consists in converting in a compound of formula II

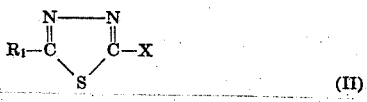

in which X is a group capable of being converted into the $R_2$-S(O)$_n$-group, X into said group and, if desired, converting any resulting compound into another compound of the invention.

A suitable group X is, for example, the mercapto group $R_2S$-, which is converted into the sulfinyl or sulfonyl group $R_2S(O)_n$- by oxidation. Such oxidation is carried out in the manner known per se, advantageously with the use of inorganic or organic oxidation agents, such as halogens or their oxidizing salts, e.g. moist chlorine or sodium periodate, heavy metal oxides or salts, e.g. chromium trioxide or potassium permanganate, preferably peroxides, such as hydrogen peroxide or percarboxylic acids, e.g. perbenzoic or mono-perphthalic acid. The formation of sulfoxides or sulfones can be controlled by the application of equivalent amounts of the oxidation agent and/or the reaction conditions, e.g. temperature or concentration.

Another group X is, for example, a reactively converted sulfino or sulfo group such as a halosulfinyl or -sulfonyl, e.g. chlorosulfinyl or -sulfonyl group. The corresponding starting material can be reacted with an $R_2$-metal compound, such as a lithium, zinc or advantageously halomagnesium compound, to form the desired compounds of formula I.

The above-mentioned reactions are carried out according to standard methods, in the presence or absence of diluents, preferably such as are inert to the reagents and are solvents thereof, of catalysts, condensing agents and/or inert atmospheres, at low temperatures, room temperature or elevated temperatures, at atmospheric or superatmospheric pressure.

The invention further includes any variant of the present process, in which an intermediate product obtainable at any stage of the process is used as starting material and any remaining steps are carried out, or the process is discontinued at any stage thereof, or in which the starting materials are formed under the reaction conditions, or in which the reaction components are used in the form of their salts. For example, alcohols, acids, ammonia, primary or secondary amines may be used in the form of their alkali metal salts or basic reactants in the form of their acid addition salts. Mainly, those starting materials should be used in the reactions of the invention that lead to the formation of those compounds indicated above as being specially valuable.

The starting material used is known or, if new, may be prepared analogously to the methods used for the known compounds. For example, the 2-mercapto compounds can be prepared by condensation of 2-halo-5-$R_1$-1,3,4-thiadiazoles with $R_2$-mercaptans, e.g. according to Adv. in Heterocycl. Chem. 9, 170 (1968) or U.S. Pat. No. 2,744,908. The reactively converted 2-sulfinic or sulfonic acids can be obtained from corresponding 2-mercapto- or 2-benzylmercapto compounds, hydrogen peroxide and a halogen, e.g. chlorine.

The pharmacologically active compounds of the invention are useful in the manufacture of pharmaceutical compositions containing an effective amount thereof in conjunction or admixture with excipients suitable for either enteral or parenteral application. Preferred are tablets and gelatin capsules comprising the active ingredient together with a) diluents, e.g. lactose, dextrose, sucrose, mannitol, sorbitol, cellulose and/or glycine, b) lubricants, e.g. silica, talcum, stearic acid, its magnesium or calcium salt and/or polyethyleneglycol, for tablets also c) binders, e.g. magnesium aluminum silicate, starch paste, gelatin, tragacanth, methylcellulose, sodium carboxymethylcellulose and/or polyvinylpyrrolidone, if desired, d) disintegrants, e.g. starches, agar, alginic acid or its sodium salt, enzymes of the binders or effervescent mixtures and/or e) adsorbents, colorants, flavors and sweeteners. Injectable compositions are preferably aqueous isotonic solutions or suspensions, and suppositories are advantageously fatty emulsions or suspensions. They may be sterilized and/or contain adjuvants, such as preserving, stabilizing, wetting or emulsifying agents, solution promoters, salts for regulating the osmotic pressure and/or buffers. They may also contain other therapeutically valuable substances. Said pharmaceutical compositions are prepared according to conventional mixing, granulating or coating methods respectively and contain about 0.1 to 75 percent, preferably about 1 to 50 percent of the active ingredient.

EXAMPLE 1

To the stirred solution of 8 g. 2-methylmercapto-5methyl-1,3,4-thiadiazole in 100 ml. diethyl ether, 33.3 g. monoperphthalic acid in 300 ml. diethyl ether are added during 15 minutes at −10°. The mixture is allowed to warm up to room temperature while stirring overnight. It is filtered, the filtrate washed with saturated aqueous sodium bicarbonate, dried, filtered and concentrated. The precipitate formed in the cold is filtered off and washed with cold diethyl ether, to yield the 2-methylsulfonyl-5-methyl-1,3,4-thiadiazole of the formula:

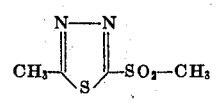

EXAMPLE 2

To the stirred solution of 6.3 g. 2-ethylmercapto-5-methyl-1,3,4-thiadiazole in 150 ml. diethyl ether, 22 g. mono-perphthalic acid in 200 ml. diethyl ether are added during one minute at −10°. The mixture is allowed to warm up to room temperature and stirred overnight. It is filtered, the residue washed with diethyl ether and the filtrate washed with saturated aqueous sodium bicarbonate and water. It is dried, filtered, evaporated, the residue distilled and the fraction boiling at 130°/0.1 mm. Hg collected, to yield the 2-ethylsulfonyl-5-methyl-1,3,4-thiadiazole of the formula:

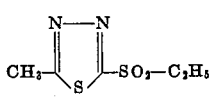

EXAMPLE 3

The stirred solution of 4 g. 2-methylmercapto-5-ethyl-1,3,4 thiadiazole in 50 ml. anhydrous diethyl ether is combined with that of 11 g. mono-perphthalic acid in 100 ml. diethyl ether while stirring at −10°. The mixture is allowed to warm to room temperature and stirred overnight. It is filtered, the filtrate washed with 200 ml. aqueous sodium bicarbonate and 100 ml. water, dried, filtered and evaporated in vacuo. The residue is distilled and the fraction boiling at 128°/0.1 mm. Hg collected, to yield the 2-methylsulfonyl-5-ethyl-1,3,4-thiadiazole of the formula:

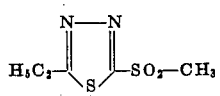

EXAMPLE 4

The solutions containing 5 g. 2-methylmercapto-5-n-butyl-1,3,4-thiadiazole in 75 ml. diethyl ether and 13 g. mono-paraphthalic acid in 125 ml. diethyl ether, are combined at −10° while stirring and stirring is continued overnight at room temperature. The resulting mixture is filtered, the residue washed with diethyl ether, the filtrate washed with saturated aqueous sodium bicarbonate, dried, filtered and evaporated. The residue is distilled and the fraction boiling at 132°–134 °/0.05 mm. Hg collected, to yield the 2-methylsulfonyl-5-n-butyl-1,3,4-thiadiazole of the formula:

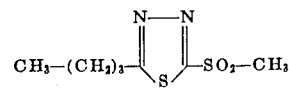

In the analogous manner the 2-ethylsulfonyl-5-n-butyl-1,3,4-thiadiazole is prepared, b.p. 135°–137°/0.03 mm. Hg.

Claims:
1. The 1,3,4-thiadiazole of the formula

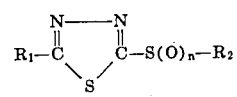

in which $R_1$ is hydrogen or lower alkyl, $R_2$ is lower alkyl and $n$ is the integer 1 or 2.

2. A compound as claimed in claim 1, in which formula each of $R_1$ and $R_2$ is lower alkyl.

3. A compound as claimed in claim 1, in which formula each of $R_1$ and $R_2$ is methyl, ethyl, n-propyl, i-propyl, n-butyl or i-butyl.

* * * * *